US012776849B2

(12) United States Patent
Miraglia et al.

(10) Patent No.: US 12,776,849 B2
(45) Date of Patent: Oct. 27, 2026

(54) METHOD AND DEVICE FOR SIGNAL FINGERPRINTING USING JOINT FEATURE LIKELIHOODS

(71) Applicant: Raytheon Applied Signal Technology, Inc., San Jose, CA (US)

(72) Inventors: Joshua Miraglia, Dammeron Valley, UT (US); Zachary Kent Rasmussen, Farmington, UT (US); Lisa Miller, Draper, UT (US); David A. Zaugg, Lehi, UT (US)

(73) Assignee: Raytheon Applied Signal Technology, Inc., San Jose, CA (US)

( * ) Notice: Subject to any disclaimer, the term of this patent is extended or adjusted under 35 U.S.C. 154(b) by 289 days.

(21) Appl. No.: 18/612,367

(22) Filed: Mar. 21, 2024

(65) Prior Publication Data

US 2025/0300756 A1 Sep. 25, 2025

(51) Int. Cl.
*H04J 14/02* (2006.01)

(52) U.S. Cl.
CPC .............................. *H04J 14/02216* (2023.08)

(58) Field of Classification Search
CPC .. H04J 14/02; H04J 14/0227; H04J 14/02216; H04J 14/0246; H04J 14/0224; H04J 14/0307
USPC ....................................................... 359/357.1
See application file for complete search history.

(56) References Cited

U.S. PATENT DOCUMENTS 5,834,203 A * 11/1998 Katzir ................ G01N 21/6428 252/582
7,027,470 B2 * 4/2006 May ...................... H01S 5/0687 372/20
8,738,255 B2 * 5/2014 Carter ..................... B60L 15/20 476/39
8,981,281 B2 * 3/2015 Nozawa ............... G02B 26/001 356/519
9,625,564 B2 4/2017 Baxley et al.
9,667,033 B2 * 5/2017 Pedersen ................. H01S 5/141
9,977,045 B2 5/2018 Tchoryk et al.
10,047,861 B2 * 8/2018 Thomassy ............ F16H 61/664
(Continued)

FOREIGN PATENT DOCUMENTS

ES 2861731 * 10/2021 ........ H04J 14/02762
WO 2006051242 A2 5/2006

*Primary Examiner* — Daniel St Cyr
(74) *Attorney, Agent, or Firm* — Millen, White, Zelano & Branigan P.C.; William F. Nixon

(57) ABSTRACT

The likelihood that a signal waveform is a Fabry-Perot signal is determined using features belonging the signal waveform. Features include a periodic peak difference likelihood and a gain profile likelihood. A spectrum snapshot of a signal waveform is captured for an optical fiber spectrum to obtain a power spectral density. A plurality of peaks is identified within the signal waveform of the spectrum snapshot. A periodic peak difference likelihood function is executed to determine a first likelihood value that the plurality of peaks is periodic. A gain profile likelihood estimator function is executed to determine a second likelihood value that the signal waveform has symmetrically decreasing peaks from center peak of the plurality of peaks. The first likelihood value and the second likelihood value are combined to determine a total likelihood value. Based on the total likelihood value, a Fabry-Perot signal is determined for the signal waveform.

20 Claims, 5 Drawing Sheets

(56) References Cited

U.S. PATENT DOCUMENTS

| | | | | |
|---|---|---|---|---|
| 11,307,019 | B2 | 4/2022 | Johnson et al. | |
| 11,698,303 | B2 | 7/2023 | Antila et al. | |
| 11,871,103 | B2 | 1/2024 | Kleinbeck | |
| 12,219,354 | B2 * | 2/2025 | Cristache | G05D 1/0246 |
| 2023/0305287 | A1 | 9/2023 | Namazi et al. | |
| 2024/0183712 | A1 * | 6/2024 | Fiore | G01J 3/2803 |

* cited by examiner

METHOD AND DEVICE FOR SIGNAL FINGERPRINTING USING JOINT FEATURE LIKELIHOODS

FIELD OF THE INVENTION

The present invention relates to fingerprinting signals using joint feature likelihoods. More specifically, the present invention relates to determining a type of Fabry-Perot signal using joint likelihood operations.

DESCRIPTION OF THE RELATED ART

Fabry-Perot signals are monochromatic signals found primarily in one or more bands in optical fiber spectrums. The technology is based on Fabry-Perot interferometers. Characteristic features may include an overall Gaussian-like gain profile from a laser diode producing the signal and various modes of constructive and destructive interference within the gain profile from the reflective chambers that the laser beam passes through. Due to the distinctive nature of the individual modes of the Fabry-Perot signal, some peak picking algorithms identify these monochromatic signals as being individual peaks spread throughout the band. It is because of this misclassification of a Fabry-Perot signal as coming from multiple sources that drives a need for a process and device to identify and mark these areas of a spectrum as coming from a single Fabry-Perot source.

SUMMARY OF THE INVENTION

In some embodiments, a method is disclosed. The method includes capturing a spectrum snapshot of a signal waveform for an optical fiber spectrum to obtain a power spectral density. The method also includes performing a peak picking process to identify a plurality of peaks within the signal waveform of the spectrum snapshot. The method also includes executing a periodic peak difference likelihood function to determine a first likelihood value that the plurality of peaks is periodic. The method also includes executing a gain profile likelihood estimator function to determine a second likelihood value that the signal waveform has symmetrically decreasing peaks from a center peak of the plurality of peaks. The method also includes combining the first likelihood value and the second likelihood value to determine a total likelihood value. The method also includes determining a type of Fabry-Perot signal for the signal waveform based on the total likelihood value.

In some embodiments, a computing device for signal identification. The computing device includes a processor. The computing device also includes a network communication. The computing device also includes a memory in communication with the processor and having stored thereon, processor-executable instructions for causing the processor to perform operations to configure the processor to capture a spectrum snapshot of a signal waveform for an optical fiber spectrum to obtain a power spectral density. The processor is further configured to perform a peak picking process to identify a plurality of peaks within the signal waveform of the spectrum snapshot. The processor is further configured to execute a periodic peak difference likelihood function to determine a first likelihood value that the plurality of peaks is periodic. The processor is further configured to execute a gain profile likelihood estimator function to determine a second likelihood value that the signal waveform has symmetrically decreasing peaks from a center peak of the plurality of peaks. The processor is further configured to combine the first likelihood value and the second likelihood value to determine a total likelihood value. The processor is further configured to determine a type of Fabry-Perot signal for the signal waveform based on the total likelihood value.

In some embodiments, a non-transitory computer-readable medium having stored thereon processor-executable instructions for performing operations including capturing a spectrum snapshot of a signal waveform for an optical fiber spectrum to obtain a power spectral density. The operations also include performing a peak picking process to identify a plurality of peaks within the signal waveform of the spectrum snapshot. The operations also include executing a periodic peak difference likelihood function to determine a first likelihood value that the plurality of peaks is periodic. The operations also include executing a gain profile likelihood estimator function to determine a second likelihood value that the signal waveform has symmetrically decreasing peaks from a center peak of the plurality of peaks. The operations also include combining the first likelihood value and the second likelihood value to determine a total likelihood value. The operations also include determining a type of Fabry-Perot signal for the signal waveform based on the total likelihood value.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining within the scope of the disclosed embodiments.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE PREFERRED EMBODIMENTS

Figure 1:
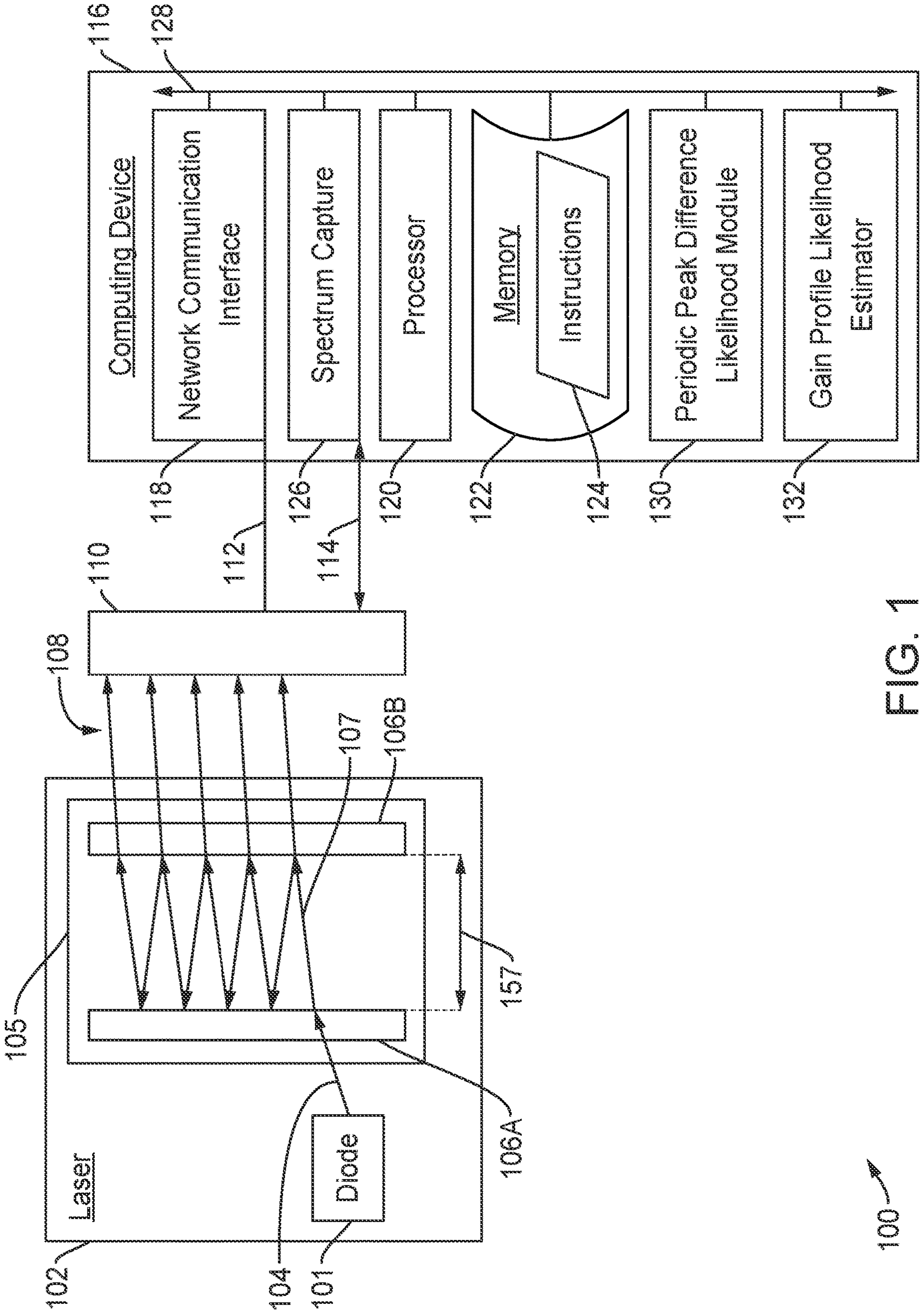
FIG. 1 illustrates a system having a Fabry-Perot interferometer according to the disclosed embodiments.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

As used herein, a letter following a reference numeral is intended to reference an embodiment of the feature or element that may be similar, but not necessarily identical, to a previously described element or feature bearing the same reference numeral, such as 1, 1a, or 1b. Such shorthand notations are used for purposes of convenience only, and should not be construed to limit the inventive concepts disclosed herein in any way unless expressly stated to the contrary.

Moreover, unless expressly stated to the contrary, “or” refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the “a” or “an” are employed to describe elements and components of embodiments of the instant inventive concepts. This is done merely for convenience and to give a general sense of the inventive concepts, and “a” and “an” are intended to include one or at least one and the singular also includes plural unless it is obvious that it is meant otherwise. It will be further understood that the terms “comprises” or “comprising,” when used in this specification, specify the presence of stated features, integers, steps, operations, elements, or components, but do not preclude the presence or addition of one or more other features, integers, steps, operations, elements, components, and/or groups thereof.

As used herein, any reference to “one embodiment,” “alternative embodiments,” or “some embodiments” means that particular element, feature, structure, or characteristic described in connection with the embodiment is included in at least one embodiment of the inventive concepts disclosed herein. The appearances of the phrase “in some embodiments” in various places in the specification are not necessarily all referring to the same embodiment, and embodiments of the inventive concepts disclosed may include one or more of the features expressly described or inherently present herein, or any combination or sub-combination of two or more such features, along with any other features that may not necessarily be expressly described or inherently present in the instant disclosure.

The inventive concepts may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Inventive concepts may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed below.

The disclosed embodiments implement a joint-likelihood classifier to identify and mark areas of the spectrum as coming from a single Fabry-Perot source. For a signal type, the disclosed embodiments may qualitatively define various features of that signal type, such as peak periodicity, peak density, amplitude modulation, and the like. While individual features are not expected to be unique to a specific signal type, the disclosed embodiments provide for the situation that there exists a set of features that defines the signal types. To algorithmically identify a signal, the disclosed embodiments may quantitatively disclose the probability of a signal exhibiting a specific feature using a likelihood function mapped to the range [0,1], with 1 being a 100% likelihood that the signal exhibits a particular feature and 0 being a 0% likelihood. Because the features for a signal may be independent of each other, the disclosed embodiments combine the likelihoods as joint probabilities to get the total probability, or likelihood, of the signal being a certain type.

For Fabry-Perot classification, the disclosed embodiments specify two features that identify the signal type. These features include strict periodic peaks and symmetrically decreasing peaks from center. For the strict periodic peak difference likelihood, the disclosed embodiments calculate the spread of the difference between neighboring peaks about a candidate peak periodicity. The median peak difference is taken as the candidate for peak periodicity. A low spread about this point may indicate a high likelihood that the found peaks are periodic, while a high spread may indicate a low likelihood. To convert the spread metric to a likelihood, the disclosed embodiments normalize the metric and divide by a significance parameter based on a peak center uncertainty before passing it to a tanh function. The tanh function may have a nice property of being smooth and having a range of [0,1] for positive inputs. For the gain profile likelihood estimator, the disclosed embodiments aim to quantitively take advantage of the sloped modes on both sides of a Fabry-Perot signal. Because Fabry-Perot modes exhibit some noise, the disclosed embodiments may not enforce monotonic behavior on the peaks. As such, the disclosed embodiments rely on fitting methods for defining the downward trend of modes. In some embodiments, the disclosed embodiments use the slopes of linear fits on both sides of the Fabry-Perot signal center as the metric for determining the gain profile.

FIG. 1 depicts a system 100 having a Fabry-Perot laser 102 according to the disclosed embodiments. System 100 includes a laser 102 that emits beams 108 from a Fabry-Perot interferometer 105. Interferometer 105 may emit offset beams 108 that are detected by detector 110. Detector 110 is configured to detect radiation that has passed interferometer 105. Detector 110 may detect multiple pass bands simultaneously. In other words, detector 110 may detect or measure at least two transmission peaks simultaneously. Signals detected by detector 110 may be used for processing within computing device 116.

Laser 102 may include a laser diode 101 to emit beam 104. Beam 104 may be referred to as a signal having light transmitting at a wavelength. In some embodiments, beam 104 is a monochromatic signal found in optical fiber spectrums, such as the O-band. The light is received by interferometer 105. Interferometer 105 includes plates 106A and 106B. Beam 104 is reflected between plates 106A and 106B multiple times as shown by reflected beam 107. Plates 106A and 106B may be glass plates having a distance 157 between them. In some embodiments, plates 106A and 106B are partially silvered glass plates.

Reflected beam 107 is reflected back and forth between plates 106A and 106B. Each time reflected beam 107 reaches plate 106B, part of the light or signal is transmitted towards detector 110, resulting in offset beams 108. Offset beams 108 may interfere with each other. A large number of interfering offset beams 108 may produce an interferometer 105 with a high resolution. Thus, interferometer 105 may make use of multiple reflections that follow an interference condition.

Detector 110 receives beams 108 from laser 102. Beams 108 may include a beam 108 emitted towards a target with offset beams produced by interferometer 105. In some embodiments, a target may be placed between interferometer 105 and detector 110. Offset beams 108 may impact the target with the radiation resulting from the impact being detected by detector 110. In other embodiments, a lens may be placed between interferometer 105 and detector 110.

System 100 also includes computing device 116. Computing device 116 may obtain information for detector 110 and perform operations to determine whether the received radiation is a Fabry-Perot signal, or a type of signal. Computing device 116 may execute operations, as disclosed below. Computing device 116 may be connected to detector 110 using network communication interface 118. Connection 112 allows data to be exchanged between detector 110 and network communication interface 118. In some embodiments, connection 112 may be a wired connection. Alternatively, connection 112 may be wireless. Further, connection 112 may be made through a network accessible by computing device 116.

Computing device 116 also includes one or more processors (processor) 120 and one or more memory storages (memory) 122. Memory 122 may store instructions 124 that are executed by processor 120. Instructions 124 configures processor 120 to perform operations, as disclosed below. Instructions 124 may be updated to configure processor 120 to perform updated operations. In some embodiments, processor 120 may be configured to invoke a periodic peak difference likelihood module 130 and a gain profile likelihood estimator 132. Processor 120 may be configured to act as these components by instructions 124. Components within computing device 116 may be connected to processor 120 via bus 128.

Processor 120 also may control a spectrum capture module 126 to capture a spectrum snapshot 114 of signal waveforms detected by detector 110. Spectrum snapshot 114 may include signal waveforms for radiation received by detector 110. Spectrum capture module 126 provides spectrum snapshot 114 to processor 120. In some embodiments, processor 120 may act as spectrum capture module 126 to retrieve the data from detector 110. Periodic peak difference likelihood module 130 and gain profile likelihood estimator 132 may use spectrum snapshot 114 in determining likelihood values to determining whether beam or beams 108 is a type of Fabry-Perot signal.

Figure 2:
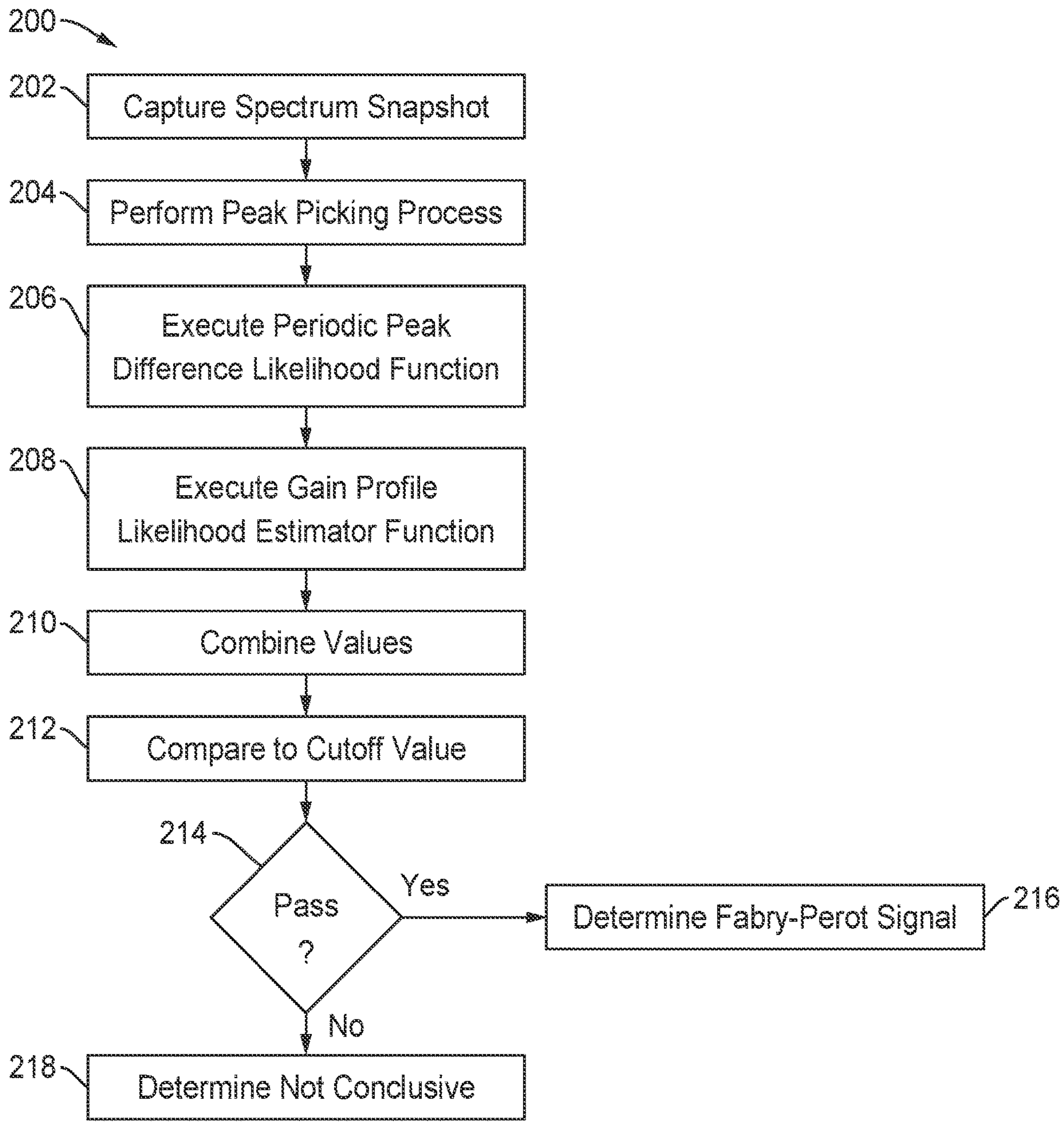
FIG. 2 illustrates a flowchart for determining whether a signal waveform is a Fabry-Perot signal according to the disclosed embodiments.

FIG. 2 depicts a flowchart 200 for determining whether a signal waveform is a Fabry-Perot signal according to the disclosed embodiments. Flowchart 200 may refer to FIG. 1 for illustrative purposes. Flowchart 200, however, is not limited to the embodiments disclosed by FIG. 1.

Step 202 executes by capturing a spectrum snapshot of signal waveforms to obtain a power spectral density. Examples of signal waveforms may be shown by FIGS. 3A, 3B, and 3C. The spectrum snapshot may be taken from detector 110. Step 204 executes by performing a peak picking process to identify a plurality of peaks within the signal waveforms. The peak picking process may be performed according to various methods. For example, a baseline may be established such that any waveform above the baseline is considered a peak.

Figure 3A:
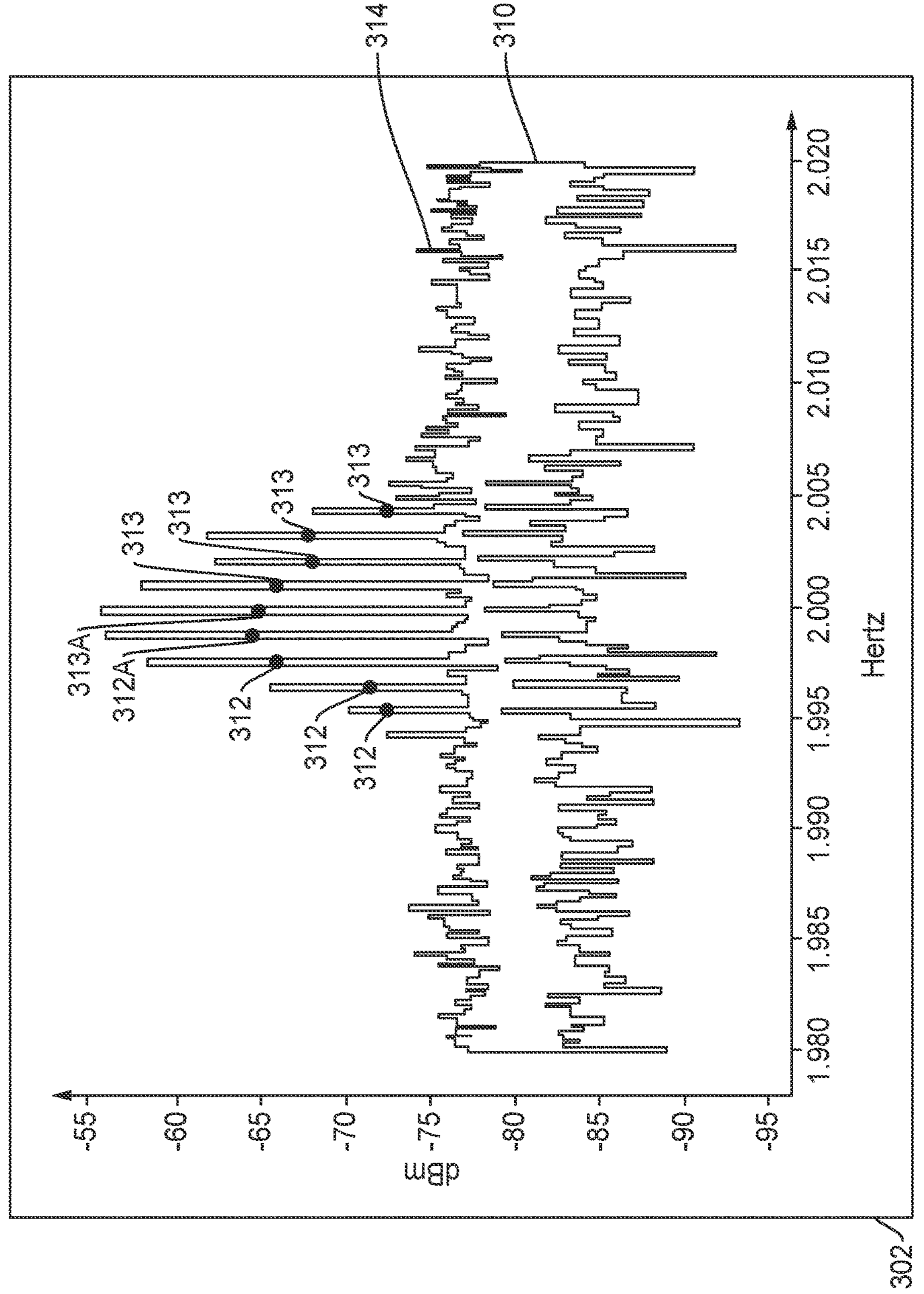
FIG. 3A illustrates an example of a spectrum snapshot of a signal waveform according to the disclosed embodiments.
Figure 3B:
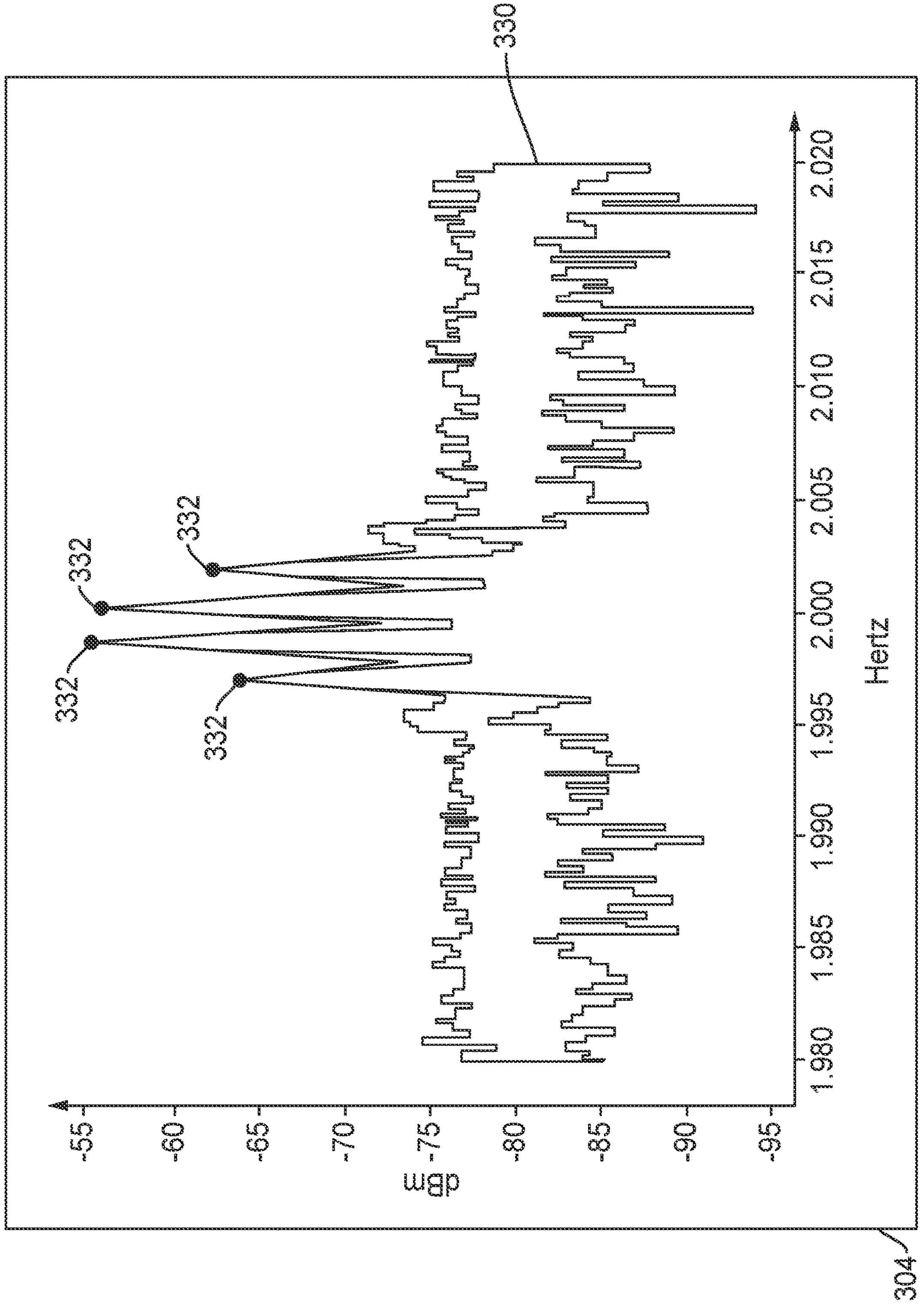
FIG. 3B illustrates another example of a spectrum snapshot of a signal waveform according to the disclosed embodiments.
Figure 3C:
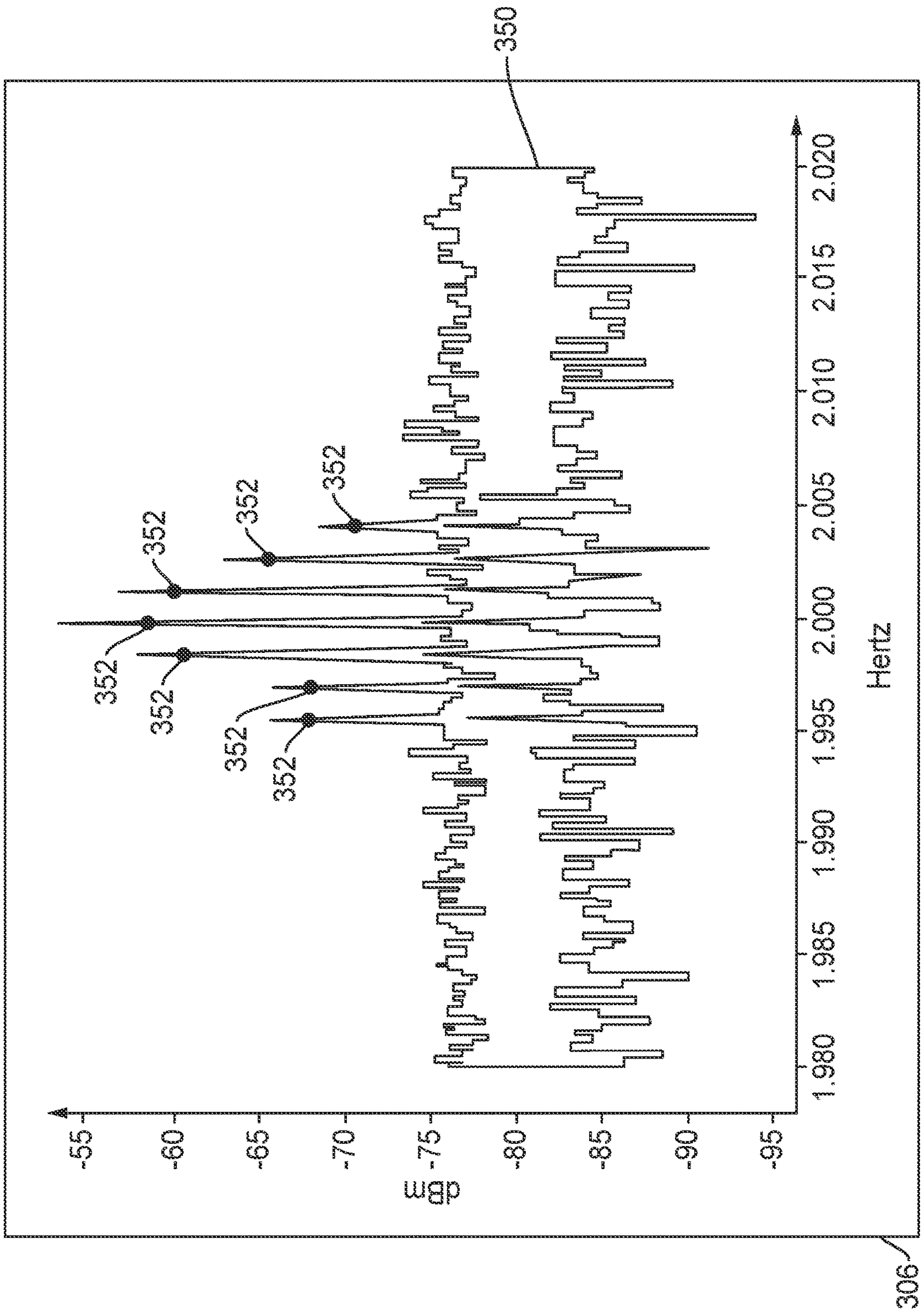
FIG. 3C illustrates another example of a spectrum snapshot of a signal waveform according to the disclosed embodiments.

Referring to FIG. 3A, signal waveform 310 is shown within spectrum snapshot 302. Signal waveform 310 includes several peaks 312 and 313. As may be appreciated, peaks 312 and 313 vary in height, or dBm. Peaks 312 and 313 may be picked according to the peak picking process. The same features are shown in FIGS. 3B and 3C. Spectrum snapshot 304 includes signal waveform 330. Signal waveform 330 includes four (4) peaks 332. Spectrum snapshot 306 includes signal waveform 350. Signal waveform 350 includes seven (7) peaks. The disclosed embodiments seek to determine whether signal waveforms 310, 330, and 350 are a result of Fabry-Perot offset beams coming from interferometer 105.

Step 206 executes by executing a periodic peak difference likelihood function to determine a periodic peak likelihood value. Periodic peak difference likelihood module 130 may be used in computing device 116 to perform this process. For a periodic peak likelihood value, module 130 calculates the spread of the differences between neighboring peaks about a candidate peak periodicity. The median peak difference may be a candidate for peak periodicity.

A low spread about across peak differences should indicate a high likelihood that the picked peaks are periodic. For example, referring to FIG. 3B, the disclosed embodiments may determine whether peaks 332 are periodic. A high spread about the point may indicate a low likelihood that peaks 332 are periodic. To convert this spread metric to a likelihood, module 130 may normalize the metric and add a significance parameter based on a peak center uncertainty before passing it to a tanh function. The tanh function acts like a hyperbolic function that provides smoothness and has a range of [0,1] for positive inputs. A likelihood function should be monotonic and exhibit a soft cutoff property so functions like an inverse exponential and tanh may be used.

In some embodiments, the peak periodic likelihood function may be shown as $$L_{pd} = 1 - \tanh\left(\left(\sum M(\Delta p'_{c,i})\right)^2 / (N * \delta p_c^2)\right), \quad \text{Equation 1}$$

$$L_{pd} = 1 - \tanh\left(\frac{\sum M(\Delta p'_{c,i})^2}{N * \delta p_c^2}\right),$$

$\Delta p_{c,i}'$=ith peak difference,

M(x)=Difference between x and multiple of median peak delta $\delta p_c$=uncertainty in peak centers where $L_{pd}$ is the peak periodic likelihood value, $$\Delta p'_{c,i}$$

is the ith peak difference, M(x) is the difference between x and a multiple of the median peak difference or delta, and $\delta p_c$ is the uncertainty in peak centers, or the significance parameter disclosed above.

Step 208 executes by executing a gain profile likelihood estimator function to determine a gain profile value. For example, gain profile likelihood estimator 132 may be used to execute this function. This function aims to quantitatively take advantage of the sloped modes on either side of the signal waveform. Because Fabry-Perot waveforms exhibit some noise, monotonic behavior on the peaks may not be accurate. Instead, the use of slopes of linear fits on either side of the Fabry-Perot signal center as the metric for determining the gain profile for a waveform.

Because the left side of the Fabry-Perot signal should have a positive slope and the right side of the signal should be negative, the average slope, in one example, may be defined as $$S_{avg} = (S_{left} - S_{right})/2 \quad \text{Equation 2}$$

This equation takes advantage of the polarity of the slopes. Further, to match the characteristic profile of the Fabry-Perot signal, the fit line should travel from the top of the spectrum to the noise floor in the span of the peaks. Referring to FIG. 3A, the fit line should travel from the top of peak 312A at −55 dBm to noise floor 314 in the span of peaks 312. The slope of this line is $S_{left}$. Another fit line would travel from the top of peak 313A and include peaks 313. The slope of this fit would result in $S_{right}$. A symmetrically decreasing gain profile would result in $S_{left}$ being positive and $S_{right}$ being negative. Thus, $S_{avg}$ would be positive. A larger positive value for $S_{avg}$ would mean a high likelihood of having a symmetrically decreasing gain profile and would have an average slope metric comparable to the signal-to-noise ratio (SNR) of the signal divided by half the number of peaks. A low likelihood may result from a low or negative average slope ($S_{avg}$).

To convert this metric into a likelihood, the disclosed embodiments may use $$L_m = 1 - \left(1/\left(1 + e^{(Savg - \mu)/\sigma}\right)\right) \quad \text{Equation 3}$$

where $S_{avg}$ is the gain profile value, μ is the average slope at which the likelihood is to be 50% (this defines the case where the slope only covers half the SNR through the peaks), σ is the spread of the likelihood and is defined such that when the average slope covers the entire range of the peaks, the likelihood is 99%. Other profiling match operations may be performed to determine the gain profile value.

Step 210 executes by combining the peak periodic likelihood value and the gain profile value into a total likelihood value. For example, the total likelihood of a signal being classified as a certain type may be $$L_{sig} = \prod_{i=0}^{N} Li, \quad \text{Equation 4}$$

where $L_{sig}$ is the likelihood that the signal is a certain type and N is the number of features belonging to the signal. Thus, Lsig may be the product of the peak periodic likelihood value and the gain profile value.

Step 212 executes by comparing the total likelihood value to a cutoff value for the Fabry-Perot signal. The disclosed embodiments further classify the signal using a cutoff defined by the likelihood of each individual component being at least a. Thus, the cutoff value, or $C_{off}$, for a signal may be expressed as $$C_{off} = \alpha^N. \quad \text{Equation 5}$$

For example, if a signal is being classified based on two features, and the cutoff is defined by being at least 85% confident that the signal exhibits each feature, then the cutoff value for the signal would be $0.85^2$, or 0.7225. The total likelihood value, or $L_{sig}$, is compared to the cutoff value, or $C_{off}$.

Step 214 executes by determining whether the total likelihood value exceeds the cutoff value, or passes the comparison that the signal is a certain type of signal, such as Fabry-Perot. If yes, then step 216 executes by determining that the signal waveform is a Fabry-Perot signal. If step 214 is no, then step 218 executes by determining that the signal waveform is not a Fabry-Perot signal.

Referring to FIGS. 3A, 3B, and 3C, signal waveforms 310, 330, and 350 are from Fabry-Perot signals. These signal waveforms show features that are likely to be found in a Fabry-Perot signal according to the disclosed embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

The invention claimed is:

1. A method comprising:

capturing a spectrum snapshot of a signal waveform for an optical fiber spectrum to obtain a power spectral density;

performing a peak picking process to identify a plurality of peaks within the signal waveform of the spectrum snapshot;

executing a periodic peak difference likelihood function to determine a first likelihood value that the plurality of peaks is periodic;

executing a gain profile likelihood estimator function to determine a second likelihood value that the signal waveform has symmetrically decreasing peaks from a center peak of the plurality of peaks;

combining the first likelihood value and the second likelihood value to determine a total likelihood value; and determining a type of Fabry-Perot signal for the signal waveform based on the total likelihood value.

2. The method of claim 1, further comprising comparing the total likelihood value with a cutoff value for the type of signal.

3. The method of claim 1, further comprising determining a laser diode to emit the type of signal.

4. The method of claim 1, wherein executing the periodic peak likelihood function includes determining a spread metric of the differences between the plurality of peaks.

5. The method of claim 4, further comprising converting the spread metric to the first likelihood.

6. The method of claim 1, wherein executing the gain profile likelihood estimator function includes using slopes on sides of the center peak to define an average slope.

7. The method of claim 6, further comprising using the average slope to determine the second likelihood function.

8. A computing device for signal identification, the computing device comprising:

a processor;

a network communication interface;

a memory in communication with the processor and having stored thereon, processor-executable instructions for causing the processor to perform operations to configure the processor to capture a spectrum snapshot of a signal waveform for an optical fiber spectrum to obtain a power spectral density;

perform a peak picking process to identify a plurality of peaks within the signal waveform of the spectrum snapshot;

execute a periodic peak difference likelihood function to determine a first likelihood value that the plurality of peaks is periodic;

execute a gain profile likelihood estimator function to determine a second likelihood value that the signal waveform has symmetrically decreasing peaks from a center peak of the plurality of peaks;

combine the first likelihood value and the second likelihood value to determine a total likelihood value; and determine a type of Fabry-Perot signal for the signal waveform based on the total likelihood value.

9. The computing device of claim 8, wherein the processor is further configured to compare the total likelihood value with a cutoff value for the type of signal.

10. The computing device of claim 8, wherein the processor is further configured to determine a laser diode to emit the type of signal.

11. The computing device of claim 8, wherein the processor is further configured to execute the periodic peak likelihood function by determining a spread metric of the differences between the plurality of peaks.

12. The computing device of claim 11, wherein the processor is further configured to convert the spread metric to the first likelihood.

13. The computing device of claim 8, wherein the processor is further configured to execute the gain profile likelihood estimator function by using slopes on sides of the center peak to define an average slope.

14. The computing device of claim 13, wherein the processor is further configured to use the average slope to determine the second likelihood function.

15. A non-transitory computer-readable medium having stored thereon processor-executable instructions for performing operations comprising:

capturing a spectrum snapshot of a signal waveform for an optical fiber spectrum to obtain a power spectral density;

performing a peak picking process to identify a plurality of peaks within the signal waveform of the spectrum snapshot;

executing a periodic peak difference likelihood function to determine a first likelihood value that the plurality of peaks is periodic;

executing a gain profile likelihood estimator function to determine a second likelihood value that the signal waveform has symmetrically decreasing peaks from a center peak of the plurality of peaks;

combining the first likelihood value and the second likelihood value to determine a total likelihood value; and determining a type of Fabry-Perot signal for the signal waveform based on the total likelihood value.

16. The non-transitory computer-readable medium of claim 15, further comprising instructions for performing operations including comparing the total likelihood value with a cutoff value for the type of signal.

17. The non-transitory computer-readable medium of claim 15, further comprising instructions for performing operations including determining a laser diode to emit the type of signal.

18. The non-transitory computer-readable medium of claim 15, wherein executing the periodic peak likelihood function includes determining a spread metric of the differences between the plurality of peaks.

19. The non-transitory computer-readable medium of claim 18, further comprising instructions for performing operations including converting the spread metric to the first likelihood.

20. The non-transitory computer-readable medium of claim 15, wherein executing the gain profile likelihood estimator function includes using slopes on sides of the center peak to define an average slope.

* * * * *